(12) United States Patent
Davies

(10) Patent No.: US 9,580,851 B2
(45) Date of Patent: Feb. 28, 2017

(54) COMPOSITE PANEL STITCHING APPARATUS AND METHOD

(71) Applicant: Gordon Davies, Troy, MI (US)

(72) Inventor: Gordon Davies, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 598 days.

(21) Appl. No.: 14/103,347

(22) Filed: Dec. 11, 2013

(65) Prior Publication Data

US 2015/0158115 A1  Jun. 11, 2015

(51) Int. Cl.
| | |
|---|---|
| *D05B 93/00* | (2006.01) |
| *D05B 37/00* | (2006.01) |
| *D05B 61/00* | (2006.01) |
| *B23K 26/40* | (2014.01) |
| *B23K 26/38* | (2014.01) |

(52) U.S. Cl.
CPC ............ *D05B 93/00* (2013.01); *B23K 26/386* (2013.01); *B23K 26/40* (2013.01); *D05B 37/00* (2013.01); *D05B 61/00* (2013.01); *B23K 2203/16* (2013.01); *D05D 2207/00* (2013.01); *D05D 2209/16* (2013.01)

(58) Field of Classification Search
CPC ........ D05B 61/00; D05B 29/06; D05C 17/00; B32B 5/26; B60R 13/04; B60R 13/0243; B23K 26/381; B23K 26/4065; B29C 2035/0838

USPC ....... 112/475.17, 402, 439, 440; 219/121.71, 219/121.7; 296/1.08, 146.7; 264/400, 264/482

See application file for complete search history.

(56) References Cited

U.S. PATENT DOCUMENTS

| | | | |
|---|---|---|---|
| 4,711,190 A | 12/1987 | Smith | |
| 6,343,558 B1 | 2/2002 | Shepard | |
| 7,661,740 B2 | 2/2010 | Salto | |
| 7,976,764 B2 | 7/2011 | Schlemmer et al. | |
| 8,556,319 B2 * | 10/2013 | Petouhoff | B60N 2/48 264/400 |
| 8,714,626 B2 * | 5/2014 | Kornylo | B60N 2/5883 112/475.18 |
| 2013/0009416 A1 | 1/2013 | Wenzel et al. | |

* cited by examiner

*Primary Examiner* — Tejash Patel
(74) *Attorney, Agent, or Firm* — Ralph E. Smith

(57) ABSTRACT

In at least one implementation, a method for forming openings for a stitched seam in a composite panel having an outer layer, and a substrate behind the outer layer includes providing a laser beam onto the substrate, with the laser beam forming an opening through the substrate but not through the outer layer, and moving at least one of the laser or the substrate relative to the other so that a new opening can be formed that is spaced from the already formed opening. Successive openings can be formed in desired locations around the panel to facilitate subsequent panel stitching. In at least some implementations, the laser may form such openings while stitches are formed in the panel, wherein a stitch is provided in a previous opening while or nearly at the same time the laser forms a different opening for a subsequent stitch.

20 Claims, 2 Drawing Sheets

COMPOSITE PANEL STITCHING APPARATUS AND METHOD

FIELD

The present disclosure relates to an apparatus and method for stitching a composite panel, such as may be used in an automotive interior.

BACKGROUND

Automotive vehicles typically include interior trim components mounted to and hiding various interior structural components and accessories. The trim components may be provided in many shapes and sizes and often include composite or multilayered materials. Certain design elements, like stitches may be desired in a composite material, like a panel for a dashboard or interior door panel.

SUMMARY

In at least one implementation, a method for forming openings for a stitched seam in a composite panel having an outer layer, and a substrate behind the outer layer includes providing a laser beam onto the substrate, with the laser beam forming an opening through the substrate but not through the outer layer, and moving at least one of the laser or the substrate relative to the other so that a new opening can be formed that is spaced from the already formed opening. Successive openings can be formed in desired locations around the panel to facilitate subsequent panel stitching. In at least some implementations, the laser may form such openings while stitches are formed in the panel, wherein a stitch is provided in a previous opening while or nearly at the same time the laser forms a different opening for a subsequent stitch.

In at least one implementation, a method for providing a stitch in a composite panel having an outer layer, and a substrate beneath the outer layer includes providing a substrate for the panel that has an opening therethrough and providing an outer layer for the panel that overlies the substrate and does not have an opening aligned with the substrate opening. An opening is pierced in the outer layer with a needle carrying thread at a location aligned with the substrate opening so that the needle enters the substrate opening after piercing though the outer layer and so that the thread is pushed through both the outer layer and the substrate via the openings in the outer layer and substrate.

An apparatus for providing a stitch in a panel including an outer layer and a substrate behind the outer layer may include a needle carrying thread to provide the stitch in the panel, the needle moveable between retracted and advanced positions where the needle penetrates the outer layer before entering the substrate when moved from its retracted to its advanced position; and a laser. The laser is located to direct a beam at the substrate and form an opening in the substrate without forming an opening through the outer layer. The laser and needle may be located in the same general workstation or work area so that, as the panel is moved relative to the needle to form successive stitches in the panel, the panel is also moved relative to the laser to form successive openings in the substrate. Desirably, the same indexed movement of the panel that is used to form the stitches is also used to provide the laser formed openings. In this way, the substrate openings may be spaced and located as desired for the stitches.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
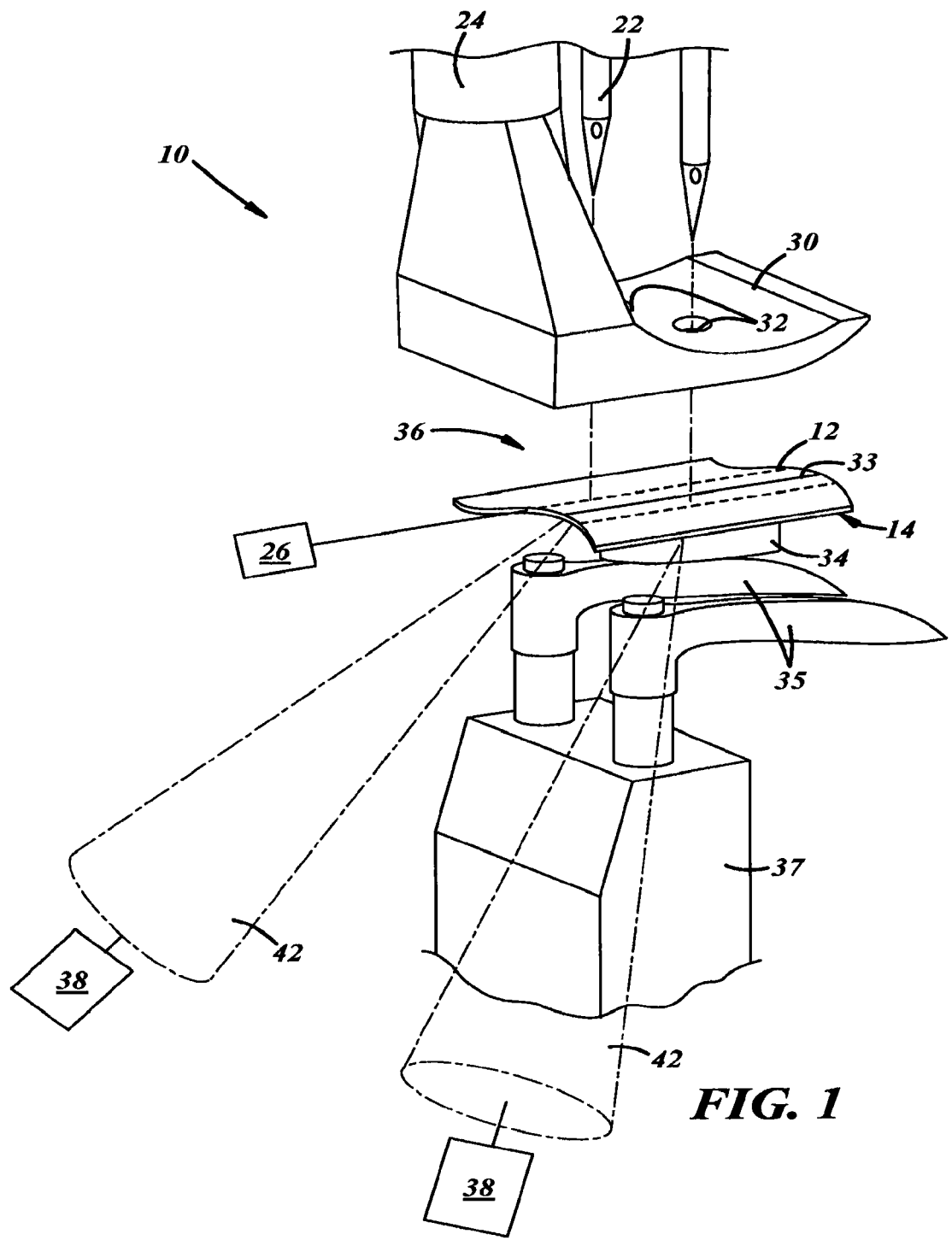
FIG. 1 is a somewhat diagrammatic perspective view of an apparatus for stitching a component.

Referring in more detail to the drawings, FIG. 1 illustrates an a stitching apparatus 10 that provides stitches 12 into a panel 14 or component, such as an interior trim piece which may be associated with an instrument panel, or other component for an automotive vehicle. The stitches may be decorative (e.g. on opposed sides of a faux seam formed in a single piece of material to simulate a junction of two pieces of materials) or functional (e.g. to join two adjacent pieces of material at a seam), as desired.

Figure 2:
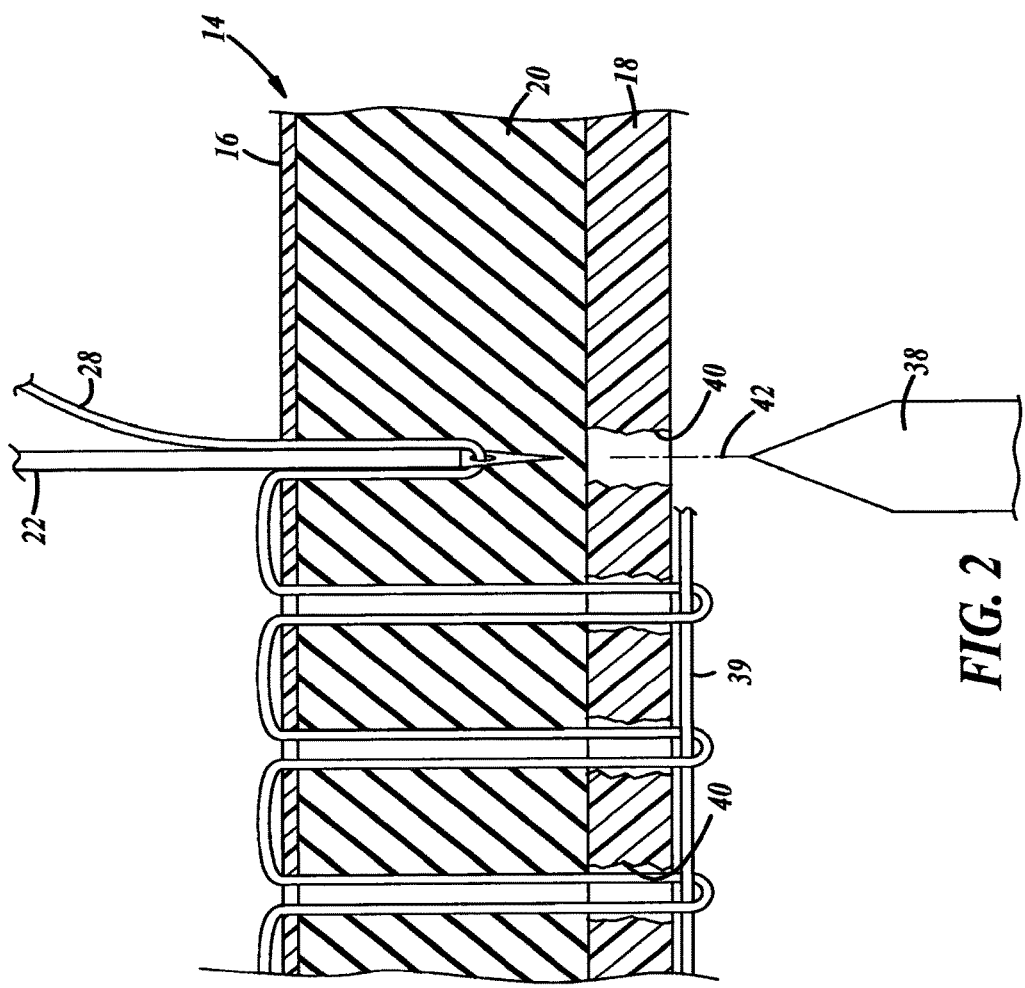
FIG. 2 is a diagrammatic sectional view of an apparatus for stitching a component.

In one form, as best shown in FIG. 2, the panel 14 is a multi-layer composite that includes an outer layer 16, a structural substrate 18 and an intermediate layer 20 sandwiched between the outer layer 16 and substrate 18. The outer layer 16 may be exposed within the vehicle interior and made of any desired material, such as a molded polymeric material or leather. Typical outer layers 16 are formed from TPO, PVC and TEO, and may be 0.6 to 1.3 mm thick. The intermediate layer 20 may be adhered to the outer layer 16, if desired, and may have any desired firmness and thickness to, for example, provide a desired thickness and overall tactile feel for the panel 14. Typical intermediate layers 20 are comprised of foam such as polyurethane and may be between 4 to 12 mm thick. The substrate 18 may be a more rigid layer and may be formed of any suitable material such as PPO and may be glass filled or otherwise reinforced, if desired. The substrate 18 may act as a base for and provide increased structural integrity to facilitate forming, handling and/or installing the panel 14, and/or to inhibit sagging, wrinkling or other movement of the outer layer 16. While so far described and shown with three layers, the panel 14 may have more or fewer layers and/or a portion of a panel may have a different number of layers than a different portion of the same panel.

As shown in FIG. 1, the panel 14 is provided with stitches 12 by a sewing apparatus 10. The apparatus 10 includes a needle 22, an actuator 24, and a shuttle 26. The needle 22 may be of conventional construction and adapted to engage and push thread 28 into the panel 14 as will be described.

The actuator 24 may be any suitable mechanism(s) that drives the needle 22 between a retracted position spaced from the panel 14 and an advanced position with at least a portion of the needle penetrated into the panel. The actuator 24 may include any suitable sewing machine mechanisms and be of conventional construction. The shuttle 26 may also be of conventional construction and may include any mechanism adapted to move the panel 14 relative to the needle 22 to facilitate application of successive stitches 12 into the panel. The term "shuttle" should not be interpreted to make any particular structure or mode of operation necessary simply because certain or even all shuttles have such structure or mode of operation.

As shown, the actuator 24 includes a head 30 that engages the outer layer 16 during the stitching process to hold the outer layer in a desired position during stitching. Openings 32 through the head 30 adjacent to the needle 22 may receive the needle and guide its movement. Also, as shown in FIG. 1, two needles 22 may be provided with each needle adapted to provide a separate row of stitches 12 to provide two spaced apart rows of stitches. In at least some implementations, the rows of stitches are provided with one row on each of two sides of a seam 33 (faux or genuine seam). The shuttle 26 includes one or more supports 34 that may engage the panel 14, and are shown as engaging the substrate 18, to position and hold the panel as the needles 22 are moved to their advanced position, and then advance the panel 14 relative to the needles when the needle is moved sufficiently toward or all the way into their retracted position. Looper devices 35 driven by a suitable actuator 37 may provide a second thread 39 (FIG. 2) to effect a typical lock or chain stitch, as desired. Other structures, devices and stitch types may be provided in addition to or instead of those noted herein.

Stitches 12 may be provided in the panel 14 by the needles 22 and other mechanisms at a workstation 36. The workstation 36 may also include one or more laser generators 38 arranged to form openings 40 in the panel 14 to facilitate the stitching process. The laser generator(s) 38 may direct a laser beam 42 at the panel 14 to form one or more openings 40 in at least the substrate 18. As shown in FIG. 2 (which is simplified and does not show the shuttle, looper devices and other such devices), in at least some implementations, the laser beams 42 may form successive, separate openings 40 that extend all the way through the substrate 18. In at least some implementations, the openings 40 do not extend through the outer layer 16 which is instead pierced by the needles 22 during the stitching process. The openings 40 may extend into, through or not at all into the intermediate layer 20 (or intermediate layers where more than one is provided). To achieve this, the intensity/power of the laser beam 42 provided by the laser generator 38 may be variable and controllable in at least certain implementations, to permit use with different panels 14 and different substrates 18 and to permit improved control of the depth of the openings 40 in the panel. In the implementation shown in FIG. 1, two laser beams 42 are provided onto the panel 14 to form separate rows of openings 40 that correspond to the separate rows of stitches 12 provided in the panel 14 by the two needles 22. That is, each laser beam 42 and hence, each row of openings 40, may be aligned with one needle 22.

In at least some implementations, the substrate openings 40 are formed generally at the same time that the panel 14 is stitched, with the substrate openings being formed at some time before the needles 22 enter their respective substrate openings 40 during the stitching process, as will be described in more detail later. The amount of time that a given substrate opening 40 is formed before a needle 22 enters that substrate opening can be varied, as desired. In at least some implementations, the openings 40 will be formed in the area of the supports 34 that engage and hold in position the substrate 18 near the actuator head 30. In this manner, as the panel 14 is advanced for successive stitches 12, the laser beams 42 can be controlled to provide successive openings 40 in the substrate 18 that correspond with the position of stitches to be made in the panel. That is, relative to the direction of movement of the panel 14, the substrate openings 40 may be formed upstream of the needles 22, and upstream of a location where a stitch 12 is applied to the panel 14. Thus, the same mechanisms and movement that registers the panel 14 with the needles 22 during successive stitches 12 may also register the panel 14 with the laser 38 to ensure accurate spacing and alignment of the substrate openings 40 and the needles, with the same apparatus used for the stitching process. In some implementations, the openings 40 may be formed within 2 mm or less from the location where the needles 22 penetrate the panel to apply a stitch to the panel. Or course, in other embodiments, the openings 40 may be formed farther away from the location of stitch application and may even be formed prior to the panel 14 being registered with the sewing apparatus 10. Other implementations may include forming the substrate openings 40 before the intermediate and outer layers 20, 16 are connected to the substrate 18, if desired.

Regardless of when the substrate openings 40 are formed, the substrate openings may be provided before the needles 22 penetrate or are inserted into the substrate 18, and the substrate openings may be used to register/align the panel 14 and needles 22 to ensure accurate needle and stitch placement within the panel. This may reduce snags or other strain on the thread 28 and avoid or reduce the likelihood that the thread will break during the stitching process. The substrate 18 may be worked on after the substrate openings 40 are formed and before the thread 28 is inserted into the substrate openings to further reduce the likelihood that the thread will break during stitching. Such optional work may include sanding, reaming, drilling, deburring or other operations as desired to improve or ensure the quality, location, orientation and/or size of the opening. In at least certain implementations, no such optional work may be needed when a laser formed opening can be provided free of significant burrs or other anomalies that may negatively affect the threads 28, 37. Further, the openings 40 through the more rigid substrate 18 reduce the stress on the thread 28 and the force needed to move the needles 22 through the substrate 18 to further improve the stitch 12 (e.g. prevent undue bagging or sagging of the panel/stitches, or the thread pulling on the outer layer too much) and reduce the likelihood that the thread 28 will break during stitching. At least in applications where undue stress is not applied to the thread 28 when a needle 22 pierces the outer layer 16 and/or intermediate layer 20, these layers need not have any preformed opening for a satisfactory stitch 12. With at least some substrates 18, the substrate openings 40 may be at least as large as the needle diameter, and in some implementations, the substrate openings may be larger than the needle to reduce friction between the substrate and needle which generates heat that may cause thread breakage and thread stress.

A method for providing a stitch in a composite panel having an outer layer and a substrate beneath the outer layer may include:

providing a substrate for the panel that has an opening therethrough;

providing an outer layer for the panel that overlies the substrate and does not have an opening therethrough aligned with the substrate opening; and piercing an opening in the outer layer with a needle carrying thread at a location aligned with the substrate opening so that the needle enters the substrate opening after piercing though the outer layer and the thread is moved through both the outer layer and the substrate via the openings in the outer layer and substrate. The process may be repeated, with successive openings pierced by the needle and aligned with successive openings in the substrate to provide successive stitches in the panel. The method may also include forming the substrate opening(s) with a laser and this step may be accomplished at any time prior to insertion of the needle into the substrate during the panel stitching. Of course, other methods may be used.

What is claimed is:

1. A method for forming openings for a stitched seam in a composite panel having an outer layer, and a substrate behind the outer layer, comprising:
    providing a laser beam onto the substrate;
    with the laser beam, forming a first opening through the substrate but not through the outer layer; and
    moving at least one of the laser or the substrate relative to the other so that a second opening can be formed that is spaced from the first opening.

2. The method of claim 1 wherein the panel is mounted relative to a machine that provides stitches on the panel and the openings are formed as the panel is moved relative to the machine and while stitches are provided on the panel.

3. The method of claim 1 wherein the openings in the substrate are formed prior to insertion of a needle into the substrate to provide a stitch.

4. The method of claim 3 wherein the laser forms the openings as the substrate is incrementally advanced relative to the needle during a sewing operation so that each increment of movement of the panel enables a new opening to be formed in the substrate and a new stitch to be provided in the panel.

5. The method of claim 1 wherein more than one laser beam is provided so that more than one opening in the substrate can be formed at one time.

6. The method of claim 1 wherein the laser does not form an opening in the outer layer.

7. The method of claim 1 wherein the outer layer is connected to the substrate when the openings are formed in the substrate.

8. The method of claim 7 wherein at least one intermediate layer is disposed between the substrate and the outer layer and the laser formed openings do not extend through the intermediate layer.

9. A method for providing a stitch in a composite panel having an outer layer, and a substrate beneath the outer layer, comprising:
    providing a substrate that has a first opening therethrough;
    providing an outer layer that overlies the substrate and does not have an opening aligned with the first opening; and
    piercing the outer layer with a needle carrying thread to form a second opening that extends through the outer layer at a location aligned with the first opening so that the needle enters the first opening after piercing though the outer layer and so that the thread is pushed through both the outer layer and the substrate via the second opening in the outer layer and the first opening in the substrate.

10. The method of claim 9 wherein the first opening is formed by a laser prior to insertion of the thread into the first opening.

11. The method of claim 10 which also includes advancing the panel relative to the needle so that a plurality of stitches are provided in the panel, and wherein a separate first opening is formed in the substrate for each stitch and the laser forms the separate first openings in the substrate as the substrate is advanced relative to the needle during the stitching process.

12. The method of claim 10 wherein more than one laser beam is provided so that more than one first opening in the substrate can be formed at one time.

13. The method of claim 10 wherein the depth of the first opening formed by the laser is controlled so that the first opening extends completely through the substrate but not through the outer layer.

14. The method of claim 9 wherein the outer layer is connected to the substrate when the first opening is formed.

15. The method of claim 14 wherein at least one intermediate layer is disposed between the substrate and the outer layer and the first openings do not extend through the intermediate layer.

16. An apparatus for providing a stitch in a panel including an outer layer and a substrate behind the outer layer, the apparatus comprising:
    a needle carrying thread to provide the stitch in the panel, the needle moveable between retracted and advanced positions where the needle penetrates the outer layer before entering the substrate when moved from its retracted to its advanced position; and
    a laser located to direct a beam at the substrate and form an opening in the substrate without forming an opening through the outer layer.

17. The apparatus of claim 16 which also includes a shuttle associated with the panel to advance the panel relative to the needle.

18. The apparatus of claim 16 wherein the laser beam is directed at the substrate in a location that is upstream from the needle relative to a direction of advancement of the panel relative to the needle.

19. The apparatus of claim 16 wherein the laser beam and needle are located in the same workstation and openings in the substrate are framed by the laser generally concurrently with said movement of the needle and thread.

20. The apparatus of claim 19 wherein the needle is advanced into an opening in the substrate while the laser forms a different opening in the substrate.

* * * * *